United States Patent [19]

Anderson et al.

[11] Patent Number: 4,796,147
[45] Date of Patent: Jan. 3, 1989

[54] METHOD FOR DETECTING VOLTAGE LOSSES IN A LOW VOLTAGE DISTRIBUTION SYSTEM

[76] Inventors: Benjamin C. Anderson, 5745 Crafton Dr., Lakeland, Fla. 33809; John H. Curran, 625 Parson Ave., Lakeland, Fla. 33801

[21] Appl. No.: 918,933

[22] Filed: Oct. 15, 1986

[51] Int. Cl.$^4$ .............................................. H02H 3/24
[52] U.S. Cl. ...................................... 361/92; 361/62; 361/65; 361/86; 340/663
[58] Field of Search ....................... 361/62, 65, 78, 79, 361/80, 87, 92, 187, 86, 88; 340/660, 663

[56] References Cited

U.S. PATENT DOCUMENTS

| | | | |
|---|---|---|---|
| 3,327,170 | 6/1967 | Sonnemann | 361/63 |
| 3,840,783 | 10/1974 | Eckart | 361/47 |
| 4,331,996 | 5/1982 | Matsko et al. | 361/92 |
| 4,441,135 | 4/1984 | Drain | 361/92 X |
| 4,607,309 | 8/1986 | Bishop | 361/65 X |
| 4,631,624 | 12/1986 | Dvorak et al. | 361/92 X |
| 4,663,691 | 5/1987 | Köppl | 361/65 |

*Primary Examiner*—A. D. Pellinen
*Assistant Examiner*—Derek S. Jennings
*Attorney, Agent, or Firm*—James H. Beusse

[57] ABSTRACT

A method and apparatus for detecting voltage losses in a power distribution line wherein a plurality of voltage sensing devices are used to generate an alarm signal which identifies the phases and locations corresponding to points at which voltage losses are detected.

4 Claims, 1 Drawing Sheet

METHOD FOR DETECTING VOLTAGE LOSSES IN A LOW VOLTAGE DISTRIBUTION SYSTEM

FIELD OF THE INVENTION

This invention relates to improvements in the detection of broken or fallen power lines and the like, and more particularly to a method for detecting loss of voltage in power distribution lines.

BACKGROUND OF THE INVENTION

An electrical power system comprises transmission and distribution lines and electric power plants situated in discrete locations. Power is generated at a power plant and sent through high voltage transmission lines to substations located some distance away. The voltage from the power plant is stepped up through a step-up transformer to a high voltage transmission line which transmits the power to a substation. The substation includes a step-down transformer which steps the voltage down to low voltage distribution lines which feed power to residential and commercial customers. This invention relates to protection of the low voltage distribution lines which feed power to residential and commercial customers.

There are numerous devices for protection of high voltage transmission lines (power plant to substation lines) comprising either electromechanical or electronic relay systems which monitor voltages and currents for the purpose of detecting faults and operating conditions in the various high voltage transmission lines. These transmission lines are protected against fault conditions in order to avoid serious equipment damage and personal injuries. Such a fault condition, for instance, might occur when transmission line insulator failure causes the transmission line to fall from an elevated position and to make contact with the ground. Line currents under such a condition can increase to several times normal current and can destroy or damage both lines and the attached equipment if the faulted line section is not cleared within a very short time after the fault condition occurs.

The prior art does not provide an adequate protective device to guard against dangers which can result from similar fault conditions on low voltage distribution lines, i.e., lines from substations to customers. Prior devices such as one disclosed in U.S. Pat. No. 3,327,170 detect broken conductors on distribution lines by generating harmonics on unbroken phase lines of the same distribution circuit. However, these devices require a three phase wye system and will not detect loss of all three phases. Another prior art device, disclosed in U.S. Pat. No. 3,840,783, detects grounds on ungrounded polyphase power distribution systems but can only be used on a three phase delta system and cannot be used on a four-wire wye system.

Other prior art devices must compare at least three phases in order to detect a phase loss in any one of the phases. Still other devices require a balanced load in all three phases for determining a loss of voltage in any one phase and are limited in sensitivity by the amount of imbalance. More commonly, power distribution lines are protected by overcurrent devices which are tripped by high current values to interrupt power to the line. Unfortunately, fallen lines do not always draw sufficient current to trip such devices thus creating unsafe conditions for persons or animals which may contact such fallen lines.

SUMMARY OF THE INVENTION

This invention has been developed for the purpose of obviating the aforesaid disadvantages of the prior art. Accordingly, the invention has as its object the provision of a remote voltage sensing circuit for low voltage power distribution lines which is capable of detecting a voltage loss in any phase. The outstanding characteristic of the invention is that sensing devices can be remotely placed at numerous locations, preferably at the ends of low voltage distribution lines and branches for detecting voltage losses. Another feature of the invention is that the device can be used on a three phase delta system or a four wire wye system.

The present invention overcomes the prior art disadvantages by providing sensors which detect broken or fallen distribution lines by detecting distribution line characteristics at locations beyond the fault location (with respect to a substation).

In general, a method and apparatus are provided for the detection of voltage losses at various locations along a relatively low voltage (4,000–25,000 VAC) distribution line. A plurality of remote voltage sensing devices remotely detect a voltage drop in any phase of a polyphase electrical system and produce an alarm or breaker trip signal when there is a voltage loss in any phase of the distribution line, loss of voltage being indicative of a broken distribution line.

In its simplest form, the sensing device comprise a relay having an actuating coil connected to be energized by the power line such that a loss of voltage will cause the relay to change state. Contacts of the relay may be connected in a sensing circuit to provide an indication of voltage loss.

DETAILED DESCRIPTION OF THE PREFERRED EMBODIMENT

With reference to the drawings in general, there is illustrated a method in one form of the invention for remotely sensing an interruption of voltage in residential and commercial low voltage distribution lines of a polyphase electrical power distribution system. In this method, a plurality of voltage sensors, such as voltage responsive relay switches as are well known in the art, are located in each phase of a low voltage distribution line. Each sensor defines an end point for a segment of the distribution line. When a sensor detects a voltage loss at an end point it completes an alarm signal which is fed to a substation or an operation center. The alarm signal allows an operator or a circuit breaker to disconnect the affected line in order to prevent equipment damage or electrical injury to persons in the vicinity of a downed power line.

Figure 1:
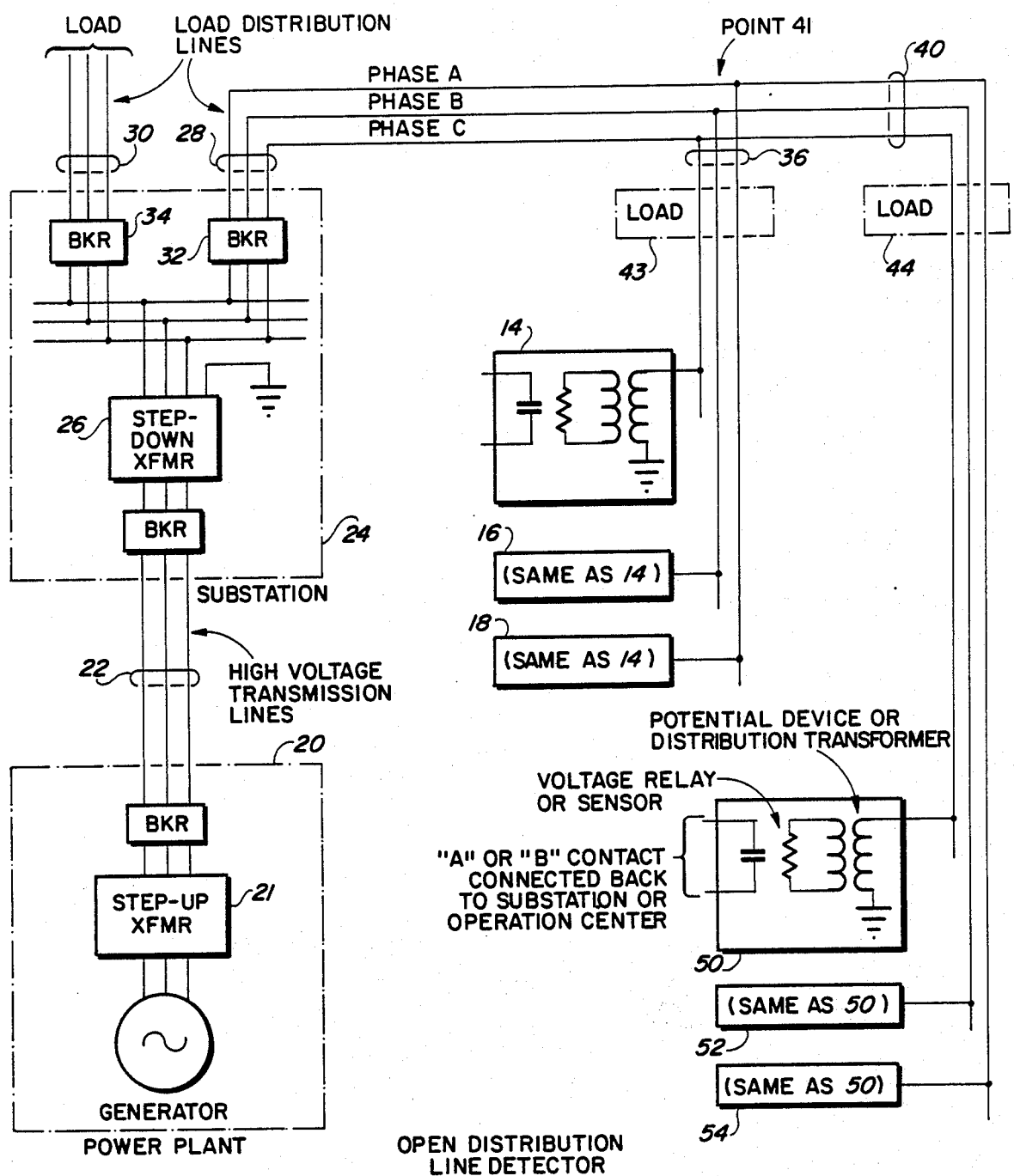
FIG. 1 is a schematic diagram showing a high voltage transmission line, a substation and low voltage distribution lines.

More particularly, and with specific reference to FIG. 1, there is shown a plurality of sensors 14, 16, 18, 50, 52, 54 for detecting a loss of voltage on a three phase low voltage distribution system. A power plant 20 generates electricity which is transferred via a step-up transformer 21 through transmission lines 22 to a substation 24. It is to be understood that a plurality of substations may be located at different geographical locations which would include the system as described hereinafter. For brevity, however, the system in combination with a single substation is explained in detail. It is to be understood that a plurality of systems in accordance with the present invention can be installed at other geographically located substations.

The substation includes a step down transformer 26 which steps the high voltage down to low voltage for distribution over low voltage lines 28 and 30. Lines 28 and 30 include breakers 32 and 34 as are well known in the art. Each breaker is capable of interrupting the current of the associated low voltage distribution lines. Referring specifically to line 28 the three phases of the distribution line are labeled A, B and C for reference. The sensors may be used in low voltage distribution lines 28 which provide power to residential and commercial customers.

For example, distribution lines 28 may branch at point 41 into a small residential load 43. In this instance, a sensor 14 is placed at the end of the branch line 36 to monitor the voltage on phase A. If a broken conductor on phase A results in a voltage loss in branch line 36, voltage sensor 14 detects the loss and subsequently completes an alarm signal specific to phase A which is fed back to the substation 24. The alarm signal can either trip breaker 32 or signal an operator to indicate that a voltage loss has been detected in a phase A line somewhere between substation 24 and sensor 14.

As is evident, a voltage sensor can be placed at the end of each individual phase of a distribution line or a branch line. For instance, referring to FIG. 1, sensors 16 and 18 are placed at the end of phases B and C of branch line 36 for detecting voltage losses in phases B and C anywhere between substation 24 and the sensor locations. Alarm signals can be run back to substation 24 from the voltage sensor 16 or 18 when a fault is detected. Numerous methods exist for transmitting the alarm signal to substation 24. For instance, a separate pair of lines may run along the distribution lines back to the substation. Alternatively, a signal may be sent over existing phone lines to substation 24.

Distribution line 40 of FIG. 1 may then continue through an industrial park as shown by load 44. In this instance, voltage sensors 50, 52 and 54 are located at the end of load 44 for monitoring the voltage of each phase at this location. If a broken conductor occurs along any power line between the substation 24 and load 44, a corresponding voltage sensor 50, 52 or 54 will complete an alarm back to substation 24 indicating which phase lines have fault conditions.

As is evident, if a voltage outage occurs between junction 41 and any of sensors 50, 52 and 54, none of sensors 14, 16 or 18 will complete an alarm back to substation 24 because sensors at load 43 only detect voltage up to that location. Thus, rather than having repair crews follow the line from substation 24 to sensor 14 in order to determine if the fault is in that segment, the operator will know to direct crews to the specific line segment between loads 43 and 44.

As is evident from FIG. 1, the method allows an operator to discern within a predetermined line segment where a voltage outage is located. In addition, the voltage sensors determine which phase lines experience the voltage loss. The voltage sensors do not rely on any imbalance between the phases which may occur if different loads are placed upon different phases. By way of example, referring to FIG. 1, if load 43 were to draw power from only phase A, a sensor or relay at the substation which measures the current difference between phases on the distribution line may not operate correctly since the loads of the phases are not balanced. It is noted also that the voltage sensors of the present invention do not depend upon the size of the wire or the length of the wire. For instance, the main line may be a large 795 AAAC wire, but the branch line may be a number 2AAAC wire. The inventive voltage sensor is totally independent of wire size and phase imbalances or line loading, thus providing a system that is simple, safe, and economical.

Figure 2:
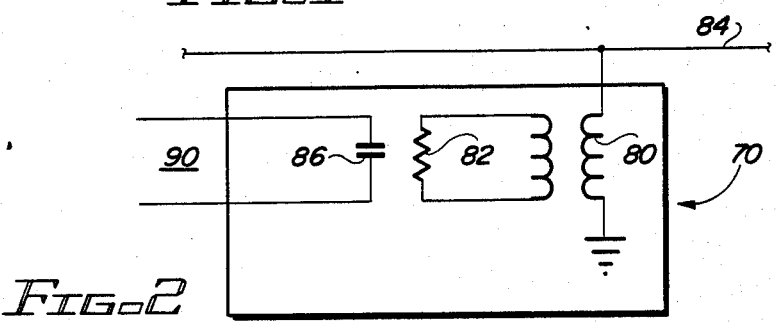
FIG. 2 is a detailed diagram of the remote voltage sensing circuit.

FIG. 2 shows a diagram of a remote voltage sensing unit in accordance with the invention. While the present invention is described hereinafter with particular reference to this sensor unit, it is to be understood at the outset of the description which follows, that other remote voltage sensor units in accordance with the present invention may be used to detect the voltage losses on electrical distribution lines.

Referring to FIG. 2, a simple remote voltage sensor 70 can be made using a transformer 80 connected to a relay 82. If voltage is present on line 84 the relay remains open. When voltage is absent on line 84, the relay closing contact 86 completes a circuit 90 which may be coupled to the substation or operation center by wires, telephone, radio, fiber optics or other communication means in order to signal that a voltage drop exists in line 84 at a position between the substation and the sensor 70. It is understood that the above described embodiment of the invention is illustrative only, and that modifications thereof may be made by those skilled in the art. Accordingly, this invention is not to be regarded as limiting in the embodiment disclosed herein but is to be limited as defined by the appended claims.

We claim:

1. A system for detecting a broken power distribution line comprising:
   (a) a multiple phase, multiple line power line distribution system, the distribution line system being characterized by unbalanced phase currents between the lines such that current varies widely in each line during normal operation independently of current in others of the lines;
   (b) a plurality of sensing means connected at predetermined locations to each phase of the low voltage distribution power line for detecting a voltage drop on the line, each of said sensing means comprising:
      (i) a relay
      (ii) a transformer having primary and secondary windings being electrically connected to the low voltage distribution line and the other of said windings being electrically connected to said relay, said relay being in a first state so long as sufficient voltage is present on the low voltage distribution line and transitioning to a second state whenever a voltage drop occurs on the low voltage distribution line; and
   (c) alarm signal circuit means connected to each of said relays for providing a broken line signal when at least one of said relays in said sensing means changes state.

2. In a power distribution system, apparatus for detecting voltage drops in each power distribution line of the system comprising:
   (a) a multiple phase, multiple line distribution line system characterized by unbalanced phase currents between lines such that current varies widely in each line during normal operation independently of current in others of the lines;

(b) a plurality of sensing means placed at predetermined locations on each distribution line for detecting a voltage drop on the line; and (c) alarm signal means connected to each of said sensing means for providing a voltage loss signal when at least one of said sensing means detects a voltage drop, wherein each of said sensing means comprising a voltage actuated relay responsive to voltage on an associated distribution line for controlling the production of signals by said alarm signal means, and each of said relays being a normally closed relay, a loss of voltage being effective to complete a circuit through contacts of said alarm signal means correspond to those segments and phases of the line in which a voltage drop has occurred.

3. A method for detecting voltage multiple line, losses in a low voltage polyphase distribution line system, the distribution line system being characterized by unbalanced phase currents between lines such that current varies widely in each line during normal operation independently of current in others of the lines, comprising the steps of:

(a) dividing the distribution line system into segments;

(b) continuously sensing the voltage for each phase of the line at end points which define segments of the line; and (c) providing an alarm signal which identifies the phase and end point location corresponding to each end point at which a voltage loss is detected.

4. The method of claim 3 wherein provision of alarm signals is controlled at each end point by a voltage relay.

* * * * *